United States Patent [19] [11] 3,857,151
Young et al. [45] Dec. 31, 1974

[54] METHOD OF MAKING A RADIATOR CORE
[75] Inventors: Fred M. Young; William V. Astrup, both of Racine, Wis.
[73] Assignee: Young Radiation Company, Racine, Wis.
[22] Filed: Oct. 15, 1973
[21] Appl. No.: 406,388

[52] U.S. Cl. ............. 29/157.3 B, 29/157.4, 29/523
[51] Int. Cl. ...................... B21d 53/02, B23p 15/26
[58] Field of Search ..... 29/157.4, 157.3 R, 157.3 B, 29/523

[56] References Cited
UNITED STATES PATENTS
| | | | |
|---|---|---|---|
| 1,992,795 | 2/1935 | Young | 165/122 |
| 2,080,374 | 5/1937 | McAllister | 29/157.5 |
| 3,428,338 | 2/1969 | Corwin | 29/157.4 X |
| 3,787,945 | 1/1974 | Pasek et al. | 29/157.4 |

FOREIGN PATENTS OR APPLICATIONS
| | | | |
|---|---|---|---|
| 849,640 | 9/1960 | Great Britain | 29/523 |
| 302,331 | 5/1929 | Great Britain | 29/157.4 |

Primary Examiner—C. W. Lanham
Assistant Examiner—D. C. Reiley, III
Attorney, Agent, or Firm—James E. Nilles

[57] ABSTRACT

A method of forming the ends of flat tubes into round cross section by mechanically expanding the ends without excessive work hardening the metal, forming serrations or threads in the header plate in which the ends are to be secured, then inserting the rounded ends of the tube into the serrated hole, and then inserting an expanding tool into the rounded end so that the round end is expanded into the threaded or serrated portion and thereby forming a solderless joint or one which requires no brazing and which joint resists failure from continuous shock and vibration and high temperature changes.

4 Claims, 7 Drawing Figures

PATENTED DEC 31 1974  3,857,151

METHOD OF MAKING A RADIATOR CORE

BACKGROUND OF THE INVENTION

This invention pertains to manufacturing radiators or liquid cooling units, particularly those of the extremely large type used in locomotives, mine trucks, or large units in work in oil fields, chemical processing or the like, wherein sometimes continuous shock and vibration and expansion or contraction of the cooling unit parts occurs and where the matrix is subjected to wide differentials of temperature.

One type of cooling unit wherein the present invention finds particular utility is of the type shown in U.S. Pat. No. 3,627,035, issued Dec. 14, 1971 and which has been assigned to an assignee common with the present application. These large type radiators are used in large equipment, such as locomotives, mine trucks, chemical processing work or the like and are sometimes subjected to extreme continuous shock, vibration, and temperature differentials and present problems not found in the same degree in smaller radiators or other types of heat exchanger units that, because of their smaller sizes, can be encased or supported and where the expansion and contraction factors are relatively of smaller degree.

The present invention is also an improvement over another patent assigned to an assignee common with the present application, namely U.S. Pat. No. 1,992,795, issued Feb. 26, 1935. That patent related to smaller heat transfer units and not to large radiators of the type where the present invention finds particular utility. That patent also showed the use of oval tubes having rounded ends for insertion in complementary shaped holes in the heat exchanger header plate.

SUMMARY OF THE PRESENT INVENTION

The present invention provides a process for manufacturing radiator or heat transfer cores including the forming of the ends of flat tubes by means of cold-forming the ends into round cross section without excessive work hardening of the tube and in such a manner so as to prevent any localized point of transition from the flat to the round cross section.

In accordance with the present invention, the header plate to which the rounded end of the tube is to be attached is serrated or threaded, for example, by a conventional threading tool and for at least a portion of the depth of the hole. The rounded end of the tube is then inserted in the serrated hole and a roller expanding tool is inserted in the rounded tube end so that the tube end is expanded and its metal flows into intimate contact with the threaded portion and the tube is also pressed tightly against the unserrated portion, if any, of the header hole. The resulting joint in the serrated portion is of homogeneous structure and the joint has tremendous holding power and is leakproof even though it is continually subjected to high shock and vibration and is also subjected to wide temperature changes. More specifically, a tool expands the flat ends of the tube by being pressed into the end of the tube without rotating the tool and in such a manner so as to avoid excessive work hardening of the tube and forming it with a smooth transition from the flat section of the tube to the round section of the tube. After the end of the tube is expanded generally into a circle by the pressing tool, the end of the tube is then furthermore sized so to insure that the end of the tube is finished to the correct diameter and in a perfectly round shape for precisely fitting the corresponding shaped hole in the header plate.

These and other objects and advantages of the present invention will appear hereinafter as this disclosure progresses, reference being had to the accompanying drawings.

DESCRIPTION OF A PREFERRED EMBODIMENT

The present invention finds particular utility in manufacturing heavy duty radiators of the type utilized in locomotives, mine trucks, chemical processing equipment or other large equipment where shock and vibration as well as high temperature differentials are encountered and which subject the radiator material, usually non-ferrous material, to severe abuse and result in breakage and leakage of the joints of the radiator or metal contained in same. Various attempts have been made to overcome the problems presented in these large radiators such as various schemes for fastening the tubes to the header plates or for accommodating shock or thermal expansion and contraction of the various parts of which this is an improvement with superior cooling ability with flat section tubing changed to round at the inlet and outlet areas.

Some of the problems presented in prior art heat transfer units are leakage of the joint between the tubes and the header plate or cracking or breakage of the tube itself somewhere in its transition zone between the flat portion of the tube and its rounded end.

Figure 1:
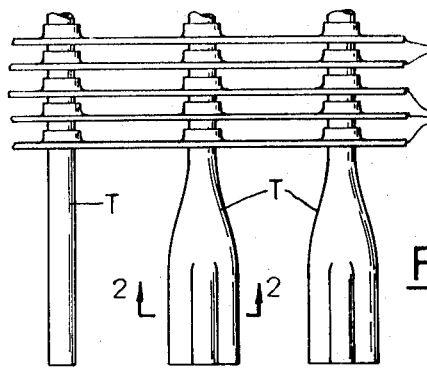
FIG. 1 is a fragmentary, elevational view of a radiator core being made in accordance with the present invention.
Figure 2:
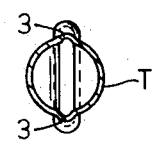
FIG. 2 is a cross sectional view of one tube, the end of which has been partially finished by a pressing tool, the view taken along line 2—2 in FIG. 1.

The present invention contemplates the use of either seamless or weld-seam flat tubing T of medium wall thickness and to which the conventional fins F are attached by soldering process. More specifically, the tubes are coated with a tin lead solder, the tubes inserted into fins as shown in FIG. 1, and the assembly is then put in an oven and heated to a point where the solder is fluid. The assembly is then removed from the oven and "squared-up" and then permitted to cool so as to form a soldered joint between the fins and the tubes. As shown in FIG. 1, some of the ends of the tubes have been preliminarily formed by a processing or pressing tool having a rounded end and which is pressed into the flattened tube and a certain distance without rotating the tool, so as to deform the end of the tube excessive work hardening, as generally shown in FIGS. 1 and 2. This cold-working of the tube end is such that excessive hardening of the tube is avoided, as is any localized stress area in the tube. It will furthermore be noted that the transition from the round section to the flat section of the tube is gradual, there being no localized points of change of direction of the tube wall, which eliminates breakage of the tube due to flexing in this particular transition zone of the tube shape.

Figure 3:
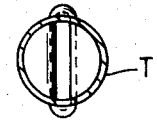
FIG. 3 is another cross-sectional view of a rounded end of the tube but after it has been sized to a precise circular dimension, the view being taken along line 3—3 in FIG. 4.

As shown in FIG. 2, the tube end, after being deformed by a pressing tool, has assumed a shape which is not completely round, but instead has projections 3 on either side. Subsequently, the tube ends are then made precisely circular and brought into proper dimension by a conventional sizing tool (not shown) so as to result in the configuration shown in FIG. 3.

Figure 4:
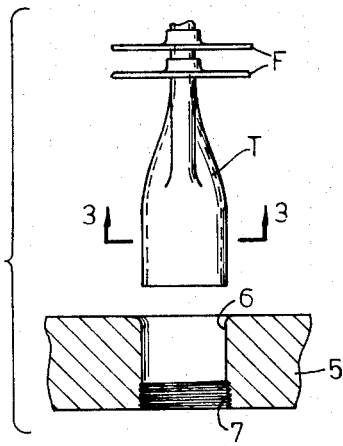
FIG. 4 is a view of the finished tube being inserted in the partially serrated or threaded hole of the header plate.

As shown in FIG. 4, the header plate 5 which is of considerable thickness in heat transfer units of the type to which the present invention pertains, has a correspondingly shaped hole 6 for receiving the round end of the tube. A portion of the hole 6 is threaded, this portion being located adjacent the outer side of the plate, so as to form threads of serrations at least at the outer end of the hole 6. These serrations or roller threads are preferably of about forty threads per inch which have been found highly successful in forming a fluid tight joint having exceptional holding power. In any event, this threading may be done by a conventional tap-type tool.

Figure 6:
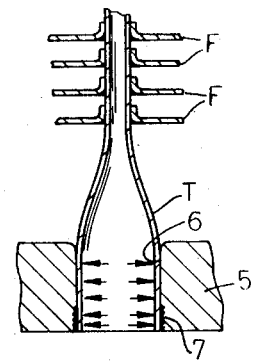
FIG. 6 is a view similar to FIG. 5, but showing the force lines of a roller expanding tool as it is being rotated and moved into the round end of the tube.
Figure 5:
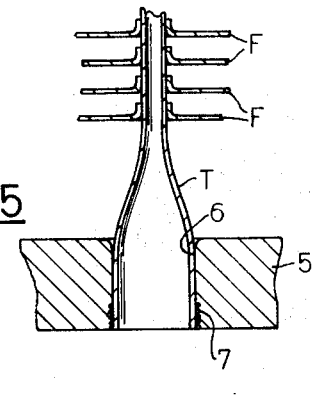
FIG. 5 is a view showing the tube inserted in the header plate but before an expanding tool has been inserted in the round end.

As shown in FIG. 5, the tube end has been inserted in the threaded hole and the tube is ready for being internally expanded. FIG. 6 shows the lines of force on the inside of the tube due to an expanding tool which is rotatable in the rounded end of the tube as it is pressed into the rounded section.

Figure 7:
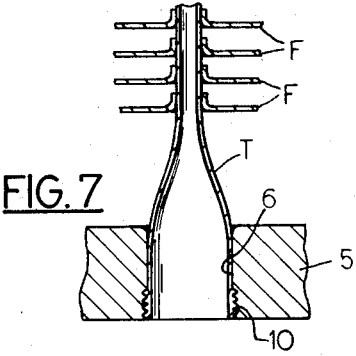
FIG. 7 is a view similar to FIG. 6, but showing the deformed end of the tube as it has flowed into the threaded section of the header plate and the tube expanded in the remainder of the header plate.

As shown in FIG. 7, the end of the tube has been caused to literally flow into the threaded portion 7 and tightly against the remaining thickness of the plate, thereby creating a water-proof joint 10 which has exceptional holding power and requires no solder or brazing operation.

We claim:

1. The process of making a radiator core having flat tubes with circular cross section ends in complementary holes in a header plate comprising, assembling fins on the flat tubes and securing them thereto, expanding and forming the ends of the flat tubes into circular cross section by pressing a tool into said ends without rotating the tool and without work hardening thereof, forming threads of a size of about 40 threads per inch in said holes of said header plate in which the circular ends are to be inserted, inserting said circular ends in said threads, expanding said circular ends to cause the metal of said ends to be deformed into said threads of said holes and create a fluid tight and solderless joint between said tube ends and said header plate.

2. The process set forth in claim 1 further characterized in that said threads are formed only adjacent an outer side of said header plate.

3. The process of making a large heavy duty radiator core having flat tubes with circular cross section ends which are inserted in complementary holes in a header plate comprising, assembling fins on the flat tubes and securing them thereto, expanding the ends of the flat tubes into generally circular cross section to deform said ends by pressing a tool into said ends without rotating the tool and without excessive work hardening thereof, sizing the generally circular cross sections, forming threads of a size of about 40 threads per inch in said holes of said header plate in which the circular ends are to be inserted, inserting said circular ends in said threaded holes, expanding said ends to cause the metal of said ends to be deformed into said threads of said holes and create a fluid tight and solderless joint between said tube ends and said header plate.

4. The process set forth in claim 3 further characterized in that said threads are formed only adjacent an outer side of said header plate.

* * * * *

UNITED STATES PATENT OFFICE
CERTIFICATE OF CORRECTION

Patent No. 3,857,151    Dated December 31, 1974

Inventor(s) Fred M. Young and William V. Astrup

It is certified that error appears in the above-identified patent and that said Letters Patent are hereby corrected as shown below:

The assignee shown on the Letters Patent Grant should be changed from "Young Radiation Company" to
---Young Radiator Company---

Signed and sealed this 4th day of March 1975.

(SEAL)
Attest:

RUTH C. MASON
Attesting Officer

C. MARSHALL DANN
Commissioner of Patents
and Trademarks